Oct. 13, 1959  E. E. STAUDT  2,908,198
CONTAINER FOR HOLDING PHOTOGRAPHIC ACCESSORIES
Filed April 8, 1957  2 Sheets-Sheet 1

Erwin Staudt
INVENTOR.

BY Daniel J. Mayne
Steve W. Gremban
ATTORNEYS

Oct. 13, 1959  E. E. STAUDT  2,908,198
CONTAINER FOR HOLDING PHOTOGRAPHIC ACCESSORIES
Filed April 8, 1957
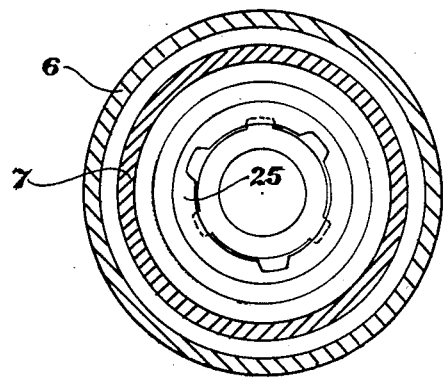
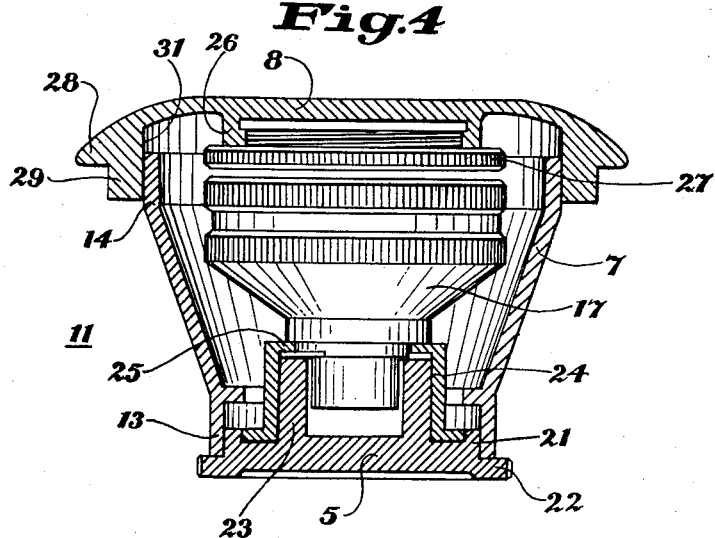

2,908,198

CONTAINER FOR HOLDING PHOTOGRAPHIC ACCESSORIES

Erwin E. Staudt, Stuttgart, Germany, assignor to Eastman Kodak Company, Rochester, N.Y., a corporation of New Jersey Application April 8, 1957, Serial No. 651,262

Claims priority, application Germany November 9, 1956

2 Claims. (Cl. 88—1)

This invention relates generally to containers, and more specifically to a container for photographic accessories in which the lens hood forms a part of the container.

In order for a photographer to take good pictures under varied conditions of light, weather, etc., it is necessary that he have special appurtenances or accessories for his optical equipment such as filters, additional lenses and lens hoods. These accessories serve, among other things, to modify the nature of the light entering the optical equipment, to alter the optical characteristics of the optical system of the equipment, and to prevent selected light radiations from entering the optical system of the equipment. These accessories are relatively expensive and when kept loose in a pocket or an additional container are prone to be damaged.

Therefore, one of the objects of the present invention is to provide an improved container for photographic accessories enabling an operator of optical equipment to carry photographic accessories without incurring any undue risk of damage thereto.

Another object of this invention is to provide an improved container for photographic accessories that obviates the inconvenience of carrying a plurality of separate, unattached accessories.

Still another object of this invention is the provision of a container for photographic accessories that is extremely compact, of simple design and inexpensive construction.

A more specific object of this invention is the provision of a container having a base and a cover adapted to selectively cooperate with a first and second lens hood to form first and second respective receptacles of different size for photographic accessories.

Objects and advantages other than those set forth above will be apparent from the following description when read in connection with the accompanying drawing, in which:

Fig. 3 is a view taken along line 3—3 of Fig. 1; and

Fig. 4 is a side elevation view partly in section of the alternative container for photographic accessories.

Figure 1:
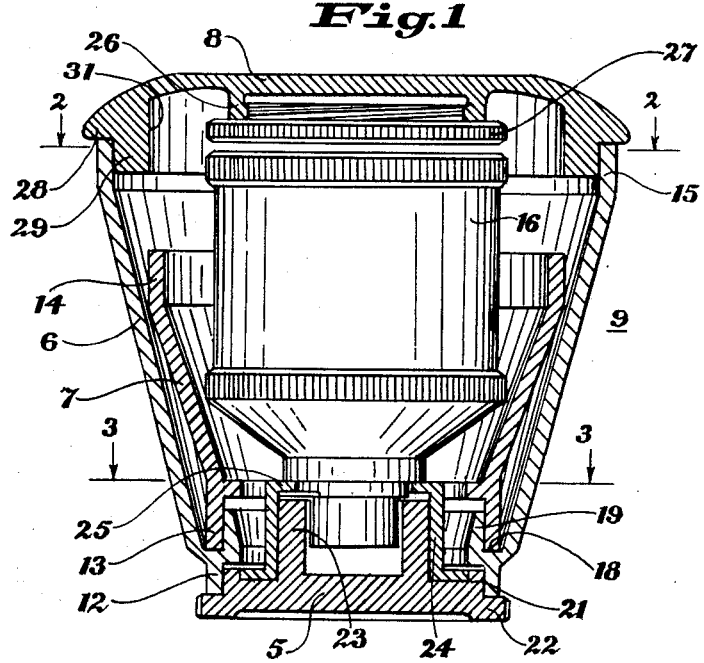
Fig. 1 is a side elevation view partly in section of a container for photographic accessories.
Figure 2:
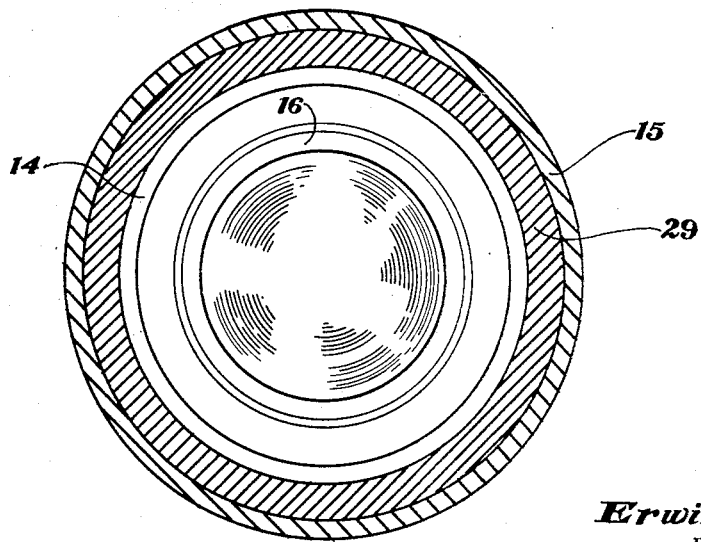
Fig. 2 is a view taken along line 2—2 of Fig. 1.

As shown in the drawings, an improved container is provided for housing photographic accessories having a circular base 5 for supporting the lens hoods 6, 7 and a cover 8 adapted to selectively detachably engage one of the lens hoods 6, 7 to form receptacles 9, 11 respectively of different size as shown in Figs. 1 and 4.

The lens hoods 6, 7 are generally cylindrical members having ends 12, 13 respectively with equal inner diameters for selectively detachably securing the lens hoods to a camera as is well known in the art. The lens hood 7 is of shorter length than the lens hood 6 and its other end 14 is of smaller diameter than the corresponding end 15 of the lens hood 6. The lens hoods 6, 7 are selectively used on a camera in conjunction with a specific lens 16, 17 respectively and are adapted to prevent the light radiations of the sun from striking the lens. The lens hood 6 is provided near its end with an annular groove 18 and annular supporting shoulder 19 to form a seat for detachably receiving and suporting the lens hood 7 as seen in Fig. 1.

The base 5 is provided with a circular shoulder 21 merging with a peripheral flange 22 to form a seat for selectively supporting one of the ends 12, 13 of the lens hoods 6, 7 respectively. Since the inner diameters of the lens hoods 6, 7 are equal as indicated heretofore, it is obvious that the outer diameter of the shoulders 19, 21 must be equal. The base 5 further has an axially extending annular ring 23 having a sleeve 24 slidably fitted thereon and cooperating therewith to form a bayonet socket 25 for selectively receiving the end of one of the lens 6, 7 as seen in Figs. 1 and 4.

The cover 8 is a circular, downwardly dished member having an annular projection 26 forming a threaded bore for receiving a filter 27. The cover 8 is provided with a peripheral lip 28 merging with an annular rib 29 to form a seat for receiving and supporting the end 15 of the lens hood 6 as seen in Fig. 1. The inner edge 31 of the rib 29 forms another seat for slidably receiving and supporting the end 14 of the other lens hood 7 as seen in Fig. 4.

In the operation of this invention, let us assume initially that the photographer is using the lens 17 shown in Fig. 4, but is not using the corresponding lens hood 7 or any of the other accessories. The remaining accessories may be combined to form a compact receptacle 9 as seen in Fig. 1 by securing the base 5 to the end 12 of the lens hood 6, mounting the lens hood 7 on the seat formed by the lens hood 6, securing the lens 16 to the base 5 by means of the bayonet socket 25, and attaching the cover 8 to the end 15 of the lens hood 6. Should the photographer now desire to use the lens hood 7 corresponding to the lens 17, he must detach the cover 8, remove the lens 16 from the base 5, remove the lens hood 17 and attach same to the camera, resecure the lens 16 to the base 5, and reattach the cover 8. Now if a different condition should present itself and the photographer decides he would receive better photographic results by using the longer lens 16, he must detach the cover 8, remove the lens 16 from the base 5, remove the lens 17 from the camera and attach the lens 16 thereto, secure the lens 17 to the base 5, and reattach the cover 8. Should the photographer now desire to use the lens hood 6 corresponding to the lens 16, he must detach the cover 8, remove the lens 17 from the base 5, detach the lens hood 7 from the lens hood 6, and secure the latter to the camera. The remaining accessories are combined to form the smaller receptacle 11 as seen in Fig. 4 by securing the base 5 to the end 13 of the remaining lens hood 7, resecuring the lens 17 to the base 5 by means of the bayonet socket 25, and attaching the cover 8 to the end 14 of the lens hood 7. It is clearly seen, therefore, that no matter what accessory or combination of accessories is used on the camera, the remaining accessories can be conveniently and compactly combined into a suitable receptacle, thus greatly minimizing the possibility of damage resulting to the accessories, particularly the lens.

Although but one embodiment has been illustrated and described, it will be aparent to those skilled in the art that various changes and modifications may be made therein without departing from the spirit of the invention or from the scope of the appended claims.

I claim:

1. In an accessory for a camera adapted to selectively form first and second receptacles incorporating one of two different size lens hoods of a camera for housing photographic accessories including a lens corresponding to one of the lens hoods not being used on said camera, the combination of: a first lens hood having support means near one end thereof; a second lens hood of shorter length than said first lens hood and having the inner diameter of one end equal to the inner diameter of said one end of said first lens hood, said one end of said second lens hood further adapted to be received by said support means; a base for detachably supporting a lens and having a seat means for selectively detachably securing said base to said one end of one of said first and second lens hoods; and a cap forming first and second attaching means corresponding to opposite ends of said first and second lens hoods respectively whereby: (1) said first lens hood is adapted when said one end receives said seat means and said opposite end receives said first attaching means to form said first receptacle for housing one of the following combinations of accessories: (a) said second lens hood supported by said support means and a lens corresponding to one of said first and second lens hoods detachably mounted on said base while said remaining lens is being used on said camera, and (b) said lens corresponding to said first lens hood detachably mounted on said base while said second lens hood and corresponding lens are being used on said camera; and (2) said second lens hood is adapted when said one end receives said seat means and said opposite end receives said second attaching means to form said second receptacle within which a lens corresponding to said second lens hood is detachably mounted on said base while said first lens hood and lens corresponding thereto are being used on said camera.

2. In an accessory for a camera adapted to selectively form first and second receptacles incorporating one of two different size lens hoods of a camera for housing photographic accessories including a lens corresponding to one of the lens hoods not being used on said camera, the combination of: a first lens hood having an annular projection near one end thereof parallel to said one end and extending in the same direction as the opposite end of said first lens hood; a second lens hood of shorter length than said first lens hood and having the inner diameter of one end equal to the inner diameter of said one end of said first lens hood and adapted to be detachably slidably received by said projection and supported thereby; a base for detachably supporting a lens and having a circular shoulder merging with a peripheral flange to provide a seat means for selectively detachably securing said base to said one end of one of said first and second lens hoods; and a cap having a peripheral lip merging with an annular rib to form first and second unassociated attaching means corresponding to opposite ends of said first and second lens hoods respectively whereby: (1) said first lens hood is adapted when said one end receives said seat means and said opposite end receives said first attaching means to form said first receptacle for housing one of the following combinations of accessories: (a) said second lens hood slidably received and supported by said projection and a lens corresponding to one of said first and second lens hoods detachably mounted on said base while said remaining lens is being used on said camera, and (b) said lens corresponding to said first lens hood detachably mounted on said base while said second lens hood and corresponding lens are being used on said camera; and (2) said second lens hood is adapted when said one end receives said seat means and said opposite end receives said second attaching means to form said second receptacle within which a lens corresponding to said second lens hood is detachably mounted on said base while said first lens hood and lens corresponding thereto are being used on said camera.

References Cited in the file of this patent

UNITED STATES PATENTS

| | | |
|---|---|---|
| 1,818,024 | Wittel | Aug. 11, 1931 |
| 2,218,884 | Kellner | Oct. 22, 1940 |
| 2,223,432 | Smith | Dec. 3, 1940 |
| 2,329,375 | Houlihan | Sept. 14, 1943 |
| 2,506,813 | Salisbury | May 9, 1950 |
| 2,740,321 | Anderson | Apr. 3, 1956 |
| 2,794,360 | Eagle | June 4, 1957 |